UNITED STATES PATENT OFFICE.

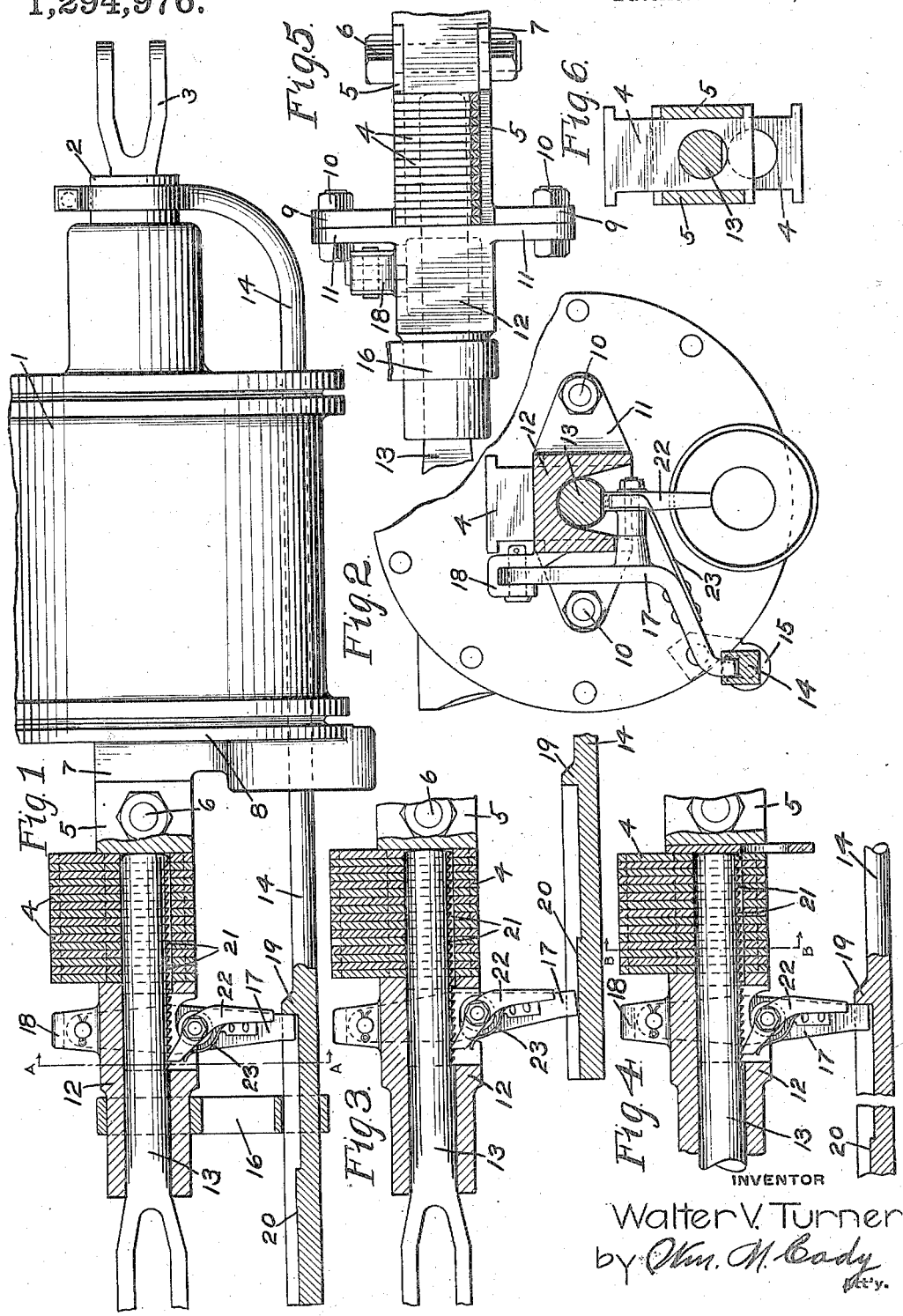

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC SLACK-ADJUSTER.

1,294,976.  Specification of Letters Patent.  Patented Feb. 18, 1919.

Application filed November 1, 1916. Serial No. 128,855.

*To all whom it may concern:*

Be it known that I, WALTER V. TURNER, a citizen of the United States, residing at Wilkinsburg, in the county of Allegheny and State of Pennsylvania, have invented new and useful Improvements in Automatic Slack-Adjusters, of which the following is a specification.

This invention relates to slack adjusters for automatically taking up the slack due to the wear of the brake shoes on the wheels and other causes in applying the brakes on railway cars.

It has heretofore been proposed to provide means operated upon the brake cylinder piston travel exceeding a predetermined amount for taking up the slack, so as to insure a more uniform piston travel.

Devices of this character are intended to compensate for the slack due to the wear of the brake shoes, but in addition to this, there is liable to be a certain amount of so-called false travel, due to the spring of the brake rigging and to the drag of the brake shoes. This false travel also effects the operation of the slack adjuster and the result is that an excessive amount of slack is taken up by the slack adjuster, so that when the brakes are in release, the brake shoes are liable to bear against the wheels, while upon applying the brakes, the piston travel will be excessively short, so that a higher brake cylinder pressure than desired is obtained for a given reduction in brake pipe pressure.

The principal object of my invention is to provide an improved slack adjuster adapted to take up the same limited amount regardless of the extent of the excess piston travel.

In the accompanying drawing; Figure 1 is an elevational view showing the improved slack adjuster, partly in section, as applied to a brake cylinder; Fig. 2 a transverse section on the line A—A of Fig. 1; Fig. 3 a view similar to Fig. 1 with the brake cylinder broken away, showing the position of parts upon an excessive travel of the brake cylinder piston; Fig. 4 a view similar to Fig. 3, showing the position of parts upon movement from the position shown in Fig. 3 to normal release position; Fig. 5 a plan view of the slack adjuster, with the adjusting shims broken away at one side to show the construction of one of the inclosing members; and Fig. 6 a transverse section on the line B—B of Fig. 4.

As shown in Fig. 1 of the drawing, the improved slack adjuster is applied to a brake cylinder 1 having the usual hollow piston rod 2 attached to the brake cylinder piston and containing the push rod 3.

The slack adjuster may comprise a plurality of adjusting shims 4 carried in a magazine having side members 5 adapted to be secured by a bolt 6 to the usual lug 7 carried by the pressure head 8 of the brake cylinder 1.

The members 5 are provided with lateral ears 9 to which are secured by bolts 10, the corresponding ears 11 of a casting 12 having a longitudinal bore for receiving a rod 13 connected to the usual brake rigging, the rod also extending through openings in the shims.

Secured to the hollow piston rod 2 is an operating rod 14 which extends rearwardly of the brake cylinder 1 and may be supported in position by a guide lug 15 secured to the brake cylinder and by a member 16 secured to the casting 12.

The rearward end of the operating rod 14 is made rectangular in cross section and is longitudinally grooved to receive the end of a trip lever 17 which is pivotally mounted on a lug 18 carried by the casting 12. The inner end of the groove is provided with a stop 19 for engaging the lever 17 and the rearward portion 20 of the bottom of the groove is raised so as to engage the lever upon a predetermined travel of the brake cylinder piston.

The under side of the rod 13 is provided with teeth 21 with which a pawl 22, pivoted to the lever 17, is adapted to engage, the pawl being yieldingly maintained in engagement with the teeth by a spring 23 secured to lever 17.

In operation, assuming the parts to be in the positions shown in Fig. 1 of the drawing, when an application of the brakes is made and the brake cylinder piston travels out, the operating rod 14 also travels outwardly with the hollow piston rod 2. If the brake cylinder piston travel exceeds the predetermined amount at which the slack adjuster is designed to operate, the end of lever 17 will be engaged by the raised portion 20, so that lever 17 is tilted to the position shown in Fig. 3 of the drawing. The elevation of the portion 20 is such that the lever 17 is tilted just enough to cause the pawl 22 to be shifted one tooth forward on the teeth 21 of the rod 13.

When the brakes are now released, the operating rod 14 is shifted back to the normal position shown in Fig. 1 and during this movement the stop 19 will engage the end of lever 17 and shift same to the normal position. This movement of lever 17 causes the pawl 22 to push the rod 13 outwardly the width of one shim 4, so that the innermost shim 4 will drop down past the inner end of the rod 13, as shown in Fig. 4.

It will now be seen that by this operation, the slack is taken up, to the extent of the width of a single shim, and since the movement of lever 17 is always the same, regardless of the extent of the excess piston travel, the adjustment of slack upon applying the brakes can never exceed the width of a single shim, so that slack due to false travel will not be taken up.

When the piston travel again exceeds the predetermined amount, upon making an application of the brakes, the same operation as hereinbefore described takes place and the next shim drops into its take-up position, and so on.

When the last shim has dropped into the take-up position by the operation of the slack adjuster, the parts may be readjusted by lifting the shims so that the openings therein are in alinement with the rod 13 and the pawl 22 being thrown out of engagement with the teeth 21, the rod 13 is pushed back to the initial position, as shown in Fig. 1 of the drawing.

Having now described my invention, what I claim as new and desire to secure by Letters Patent is:

1. In a slack adjuster, the combination with a lever and means operated by the movement of said lever for taking up the slack and means for holding the slack taken up, of a member movable with the brake cylinder piston and having means for engaging and moving said lever upon movement of the brake cylinder piston both in releasing and in applying the brakes.

2. In a slack adjuster, the combination with a lever, means operated by the movement of said lever for taking up the slack and means for holding the slack taken up, of a member movable with the brake cylinder piston and having means for engaging and moving said lever in one direction upon movement of the brake cylinder piston to apply the brakes and in the opposite direction upon movement of the brake cylinder piston to release the brakes.

3. In a slack adjuster, the combination with a pivoted lever, a rod connected to the brake rigging for taking up slack, shims for holding said rod in its adjusted position, and a pawl associated with said lever for actuating said rod upon tilting the lever, of a member movable with the brake cylinder piston for tilting said lever a fixed amount when the piston travel exceeds a predetermined amount.

4. In a slack adjuster, the combination with a rod connected to the brake rigging and movable to take up slack and shims adapted to drop into position for holding said rod in its adjusted position, of a lever, a pawl carried by said lever for shifting said rod upon angular movement of the lever, and an operating rod movable with the brake cylinder piston and having a projecting portion for engaging the lever upon a predetermined piston travel.

5. In a slack adjuster, the combination with a lever, the angular movement of which is adapted to take up slack, of a member movable with the brake cylinder piston and having a stop for engaging the lever upon movement in one direction and a raised portion for tilting the lever a fixed amount upon movement of said member beyond a predetermined point in the opposite direction.

In testimony whereof I have hereunto set my hand.

WALTER V. TURNER.

Copies of this patent may be obtained for five cents each, by addressing the "Commissioner of Patents, Washington, D. C."